US006925204B2

(12) United States Patent
Ito

(10) Patent No.: US 6,925,204 B2
(45) Date of Patent: Aug. 2, 2005

(54) IMAGE PROCESSING METHOD AND IMAGE PROCESSING APPARATUS USING THE SAME

(75) Inventor: Tadayuki Ito, Tokyo (JP)

(73) Assignee: Sega Corporation, Tokyo (JP)

( * ) Notice: Subject to any disclaimer, the term of this patent is extended or adjusted under 35 U.S.C. 154(b) by 738 days.

(21) Appl. No.: 09/730,609

(22) Filed: Dec. 7, 2000

(65) Prior Publication Data

US 2002/0012002 A1 Jan. 31, 2002

(30) Foreign Application Priority Data

| Dec. 16, 1999 | (JP) | ............................................ 11-357119 |
| Apr. 11, 2000 | (JP) | ....................................... 2000-109152 |

(51) Int. Cl.$^7$ ................................................. G06K 9/00
(52) U.S. Cl. ...................................... 382/162; 345/587
(58) Field of Search ................................ 388/162–167; 345/582–588

(56) References Cited

U.S. PATENT DOCUMENTS

| 4,727,365 | A | | 2/1988 | Bunker et al. | |
| 5,831,624 | A | * | 11/1998 | Tarolli et al. | ................ 345/587 |
| 6,005,582 | A | * | 12/1999 | Gabriel et al. | ............... 345/586 |
| 6,040,837 | A | * | 3/2000 | Wong et al. | ................. 345/586 |
| 6,078,335 | A | * | 6/2000 | Wong et al. | ................. 345/582 |
| 6,097,397 | A | * | 8/2000 | Lee | .............................. 345/586 |
| 6,151,029 | A | * | 11/2000 | Shirman et al. | ............. 345/428 |
| 6,157,386 | A | * | 12/2000 | Wilde | .......................... 345/587 |
| 6,184,893 | B1 | * | 2/2001 | Devic et al. | ................. 345/582 |
| 6,184,894 | B1 | * | 2/2001 | Rosman et al. | ............. 345/582 |
| 6,191,793 | B1 | | 2/2001 | Piazza et al. | |
| 6,232,981 | B1 | * | 5/2001 | Gossett | ........................ 345/582 |
| 6,292,191 | B1 | * | 9/2001 | Vaswani et al. | ............. 345/582 |
| 6,292,193 | B1 | * | 9/2001 | Perry et al. | .................. 345/582 |
| 6,304,268 | B1 | * | 10/2001 | Iourcha et al. | .............. 345/428 |
| 6,373,496 | B1 | * | 4/2002 | Iourcha | ....................... 345/587 |

FOREIGN PATENT DOCUMENTS

| GB | 2331905 A | 2/1999 |
| JP | 11-250279 | 9/1999 |
| JP | 11-339072 | 10/1999 |

OTHER PUBLICATIONS

Huttner, Tobias et al., "Fast Footprint MIPmapping", WSI/GRIS, University of Tubingen.

* cited by examiner

*Primary Examiner*—Jingge Wu
(74) *Attorney, Agent, or Firm*—Dickstein Shapiro Morin & Oshinsky LLP

(57) ABSTRACT

Texture coordinates and LOD (Level of Detail) values are computed on a pixel-by-pixel basis from object data, and based on the texture coordinates and LOD values, a filtering domain of texels read from a texture memory is determined, and a weighted average is acquired depending on the size of the determined filtering domain, to create the texture color to be adhered to the polygon.

16 Claims, 15 Drawing Sheets

IMAGE PROCESSING METHOD AND IMAGE PROCESSING APPARATUS USING THE SAME

BACKGROUND OF THE INVENTION

1. Field of the Invention

The present invention relates generally to an image processing method and an image processing apparatus using the same, and, more particularly, to a method for acquiring the texture color taking into consideration LOD (Level of Detail) values of object data such as polygon data, as well as to an image processing apparatus using the same.

2. Description of the Related Art

FIG. 1 depicts texture mapping in computer graphics technology. FIG. 1A shows screen space in (sx, sy) coordinate system, in which a texture suitable for the polygon PG performed as an object on the screen is read from texture memory and mapped per pixel. In FIG. 1A, point x of a polygon PG indicates one of the pixels which compose a polygon PG in (sx, sy) coordinate system.

FIG. 1B shows texture space in (u, v) coordinate system of texture memory. There texture appropriate for each pixel is read by accessing the address space in texture memory included in the polygon data. In FIG. 1B, point X is a texel in address space (tu, tv) in texture memory, equivalent to the point x of polygon PG on the screen.

If texture color of the texel which is determined by address space (tu, tv) of texture memory is to be mapped onto the polygon as it is, it would be difficult to get the smooth rendering image when polygon moves in the direction parallel to the screen, as the degree of the texture color variance is large.

Such problems can be avoided by employing bilinear filtering, a well-known technique to obtain the appropriate texture color values to be written on polygons. (cf. JP-7-40171)

FIG. 2 depicts the bilinear filtering. In FIG. 2, texels a to f in texture memory are shown. In the case that polygons move parallel to the screen, texture address of the pixel corresponding to texel b switches to that of texel e. But the simple transition from texel b to texel e causes nonsmooth image rendering, as color variance is too large.

Thus, in bilinear filtering, weighted averaging is needed for a pixel and adjacent four texels, i.e., weighted averaging is to be made in domain II of the 1×1 texel which includes the centered pixel PC and adjacent texels b, c, e, and f. The calculation result should be the color value of the texture to be obtained.

FIG. 3 depicts the relation between the distance from the viewpoint (VP) and the rendering image of polygons. As is indicated in FIG. 3A., such a case should be studied when polygons move vertically against the VP.

The farther the polygon moves from the VP along the z axis, the smaller the size of performed polygon becomes as is shown in FIG. 3B and FIG. 3C, and the rougher the LOD (Level of Detail) value of the rendering image.

For this reason, texture MIP mapping structure, as shown in FIG. 4 is employed. Multiple texture MIP maps of different sizes, which are $2^n$ times as large each other, are to be prepared beforehand. The MIP map which best matches the polygon is selected according to the distance from VP, namely, the LOD level.

When polygons move along z axis, however, it is difficult to get the smooth image rendering by simply switching the MIP maps, as the color variance is too large at the points of transition.

To avoid such inconveniences, trilinear filtering technique, as is described in JP-7-40171 mentioned above is used. As shown in FIG. 3A, when a polygon moves along z axis, from point$\alpha$ through domain$\beta$ to point$\gamma$, MIP map, MP1 in FIG. 4 is used at point$\alpha$, and MIP map, MP2 is used at point $\gamma$. As it can be seen in FIG. 3A, the degree of the texture color variance is significantly large at the transition points from $\alpha$ to $\gamma$, if these two MIP maps are used.

Thus, the domain$\beta$ is to be put in-between, and the texture color, whose value is calculated from those of the texture colors of MP1 and MP2 is to be interpolated.

Texture color values for MP1 and MP2 are obtained from that of bilinearly filtered texture color, explained in FIG. 2.

As described above, bilinear filtering and trilinear filtering techniques are known as smoothening technique of image rendering.

The LOD value of the texture to be mapped onto polygon PG becomes larger in proportion to the Z value of the pixel. As is explained in FIG. 3, texture is to be given as MIP map structure to avoid the large color variance, aliasing, at the time of texture mapping to polygon. In this case, texture MIP map corresponding to the LOD value of the polygon should be referred to.

With bilinear filtering technique, a discontinuity in the texture will remain at the point of the transition of texture MIP maps chosen according to the LOD values. Trilinear filtering technique is used to avoid this defect. Here, a color value to be interpolated is calculated from two texture color values of the neighboring texture MIP maps bilinearly filtered according to the LOD values.

The discontinuity in the texture can be adjusted by adopting the calculation result (interpolation) as the ultimate texture color.

There is a problem in terms of the image and performance, however, when you adopt trilinear filtering mentioned above.

Trilinear filtering is so composed as to generate the texture color from two texture maps each of which has different LOD; thus unnecessary color information at low frequency will be added. The image after filtering becomes blurred by this.

Two random accesses should inevitably occur with the trilinear filtering technique, in which MIP map structure is loaded in the memory and texels are referred to from two different MIP maps. Thus, theoretically speaking, performance will be ½ compared to the case using bilinear filtering technique. The real efficiency is worse than that; below ½.

As is shown in FIG. 2, the size of the domain in which weighted averaging is implemented for a pixel and adjacent texels remains the same in bilinear filtering.

Thus, as shown in FIG. 5, if polygon PG to which texture is to be mapped is skewed against the screen SC, i.e., if polygon is skewed in the depth direction from VP (z axis), there will occur the problem mentioned below.

In such cases, as the size of the domain remains the same when using bilinear and trilinear filtering technique, the additional unnecessary color information of the texel may be added. The texture image will be blurred after the filtering procedure.

SUMMARY OF THE INVENTION

It is therefore the object of the present invention to provide an image processing method capable of obtaining excellent filtering results with little blurring irrespective of a polygon which is formed so as to be inclined in a z-axial direction and to be prolonged in its inclination direction; and an image processing apparatus using the same.

The basic concept of an image processing method and an image processing apparatus using the same of the present invention in order to attain the above problems lies in that a filtering domain is transformed to have an appropriate size by use of at least longitudinal and lateral two-dimensional LOD values with respect to a screen. Thus, an intrinsically undesirable color of a texel is prevented from mixing in.

According to a first aspect of the present invention, there is provided an image processing method comprising the steps of: operating on a pixel-by-pixel basis texture coordinates and LOD (Level of Detail) values from object data; determining based on the LOD values a filtering domain of texels read from a texture memory; and acquiring a weighted average depending on the texture coordinates and the size of the determined filtering domain to create a texture color to be pasted to the object.

Preferably, the texel read from the texture memory is determined based on the operated texture coordinates and LOD values.

Preferably, determination of the texel filtering domain is performed by use of two or more dimensional LOD values.

Preferably, in the process of determining the texel filtering domain, an offset value is added with a predetermined preset parameter to modify the LOD values.

Preferably, in the process of determining the filtering domain, depending on the LOD values and a parameter for designating the manner of selecting a plurality of mipmap data, one of the plurality of mipmap data stored in the texture memory is selected.

Preferably, in the process of determining the filtering domain, the number of texels required to acquire a texture color is determined in accordance with a predetermined flag.

Preferably, in the process of determining the filtering domain, depending on a parameter for selecting whether or not a plurality of values of the LOD values are to be unified to any one, the LODs are unified to any one in compliance with the parameter for designating the manner of selecting the plurality of mipmap data.

Preferably, the step of acquiring the weighted average includes acquiring a blend ratio and a decision flag in the filtering domain from the texture coordinates and the filtering domain; deciding, by the decision flag, texels to be excluded from the object for acquiring the weighted average, out of the texels read from the texture memory; and acquiring the weighted average of the texels as the object in accordance with the blend ratio.

Preferably, the step of determining the filtering domain further includes modifying the LOD values with a predetermined parameter and determining a final filtering domain based on a flag indicative of how many texels are to be used to acquire a texture color; and in case of selecting a mode of four texels by the flag indicative of how many texels are to be used to acquire a texture color, setting the decision flag corresponding to which one of four-divided domains of a texel positioned centrally of nine texels contains the center point of the filtering domain.

Preferably, the step of determining the filtering domain further includes modifying the LOD values with a predetermined parameter, and determining a final filtering domain based on a flag indicative of how many texels are to be used to acquire the texture color; and in case of selecting a mode of nine texels by the flag indicative of how many texels are to be used to acquire the texture color, indicating the blend ratio and decision flag correspondingly to four areas into which the nine texels are divided by lines passing through the center of the filtering domain, a first one of the four areas containing the upper left vertex of the filtering domain, a second one of the four areas containing the upper right vertex of the filtering domain, a third one of the four areas containing the lower left vertex of the filtering domain, and a fourth one of the four areas containing the lower right vertex of the filtering domain.

BRIEF DESCRIPTION OF THE DRAWINGS

The above and other features will become more apparent form the following description of the embodiments of the invention when read in conjunction with the accompanying drawings in which:

FIG. 17 is a diagram for explaining a method for determining a decision flag of 4-texel sampling;

DESCRIPTION OF THE PREFERRED EMBODIMENTS

Figure 1B:
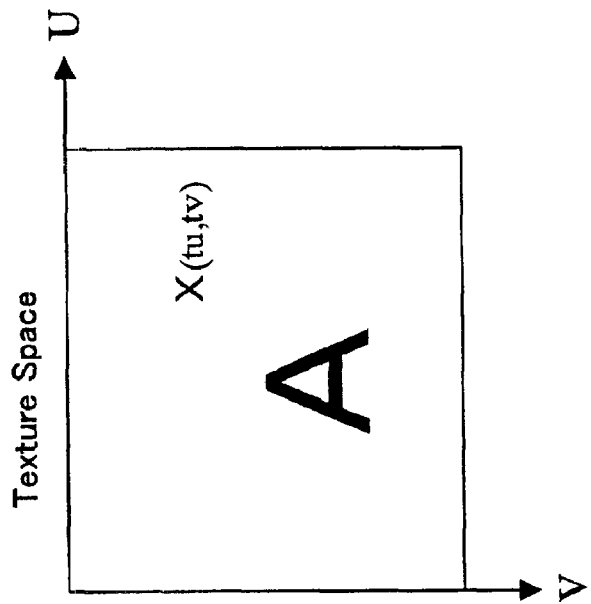
FIGS. 1A and 1B are diagrams for explaining sticking of textures in a computer graphic technique.
Figure 1A:
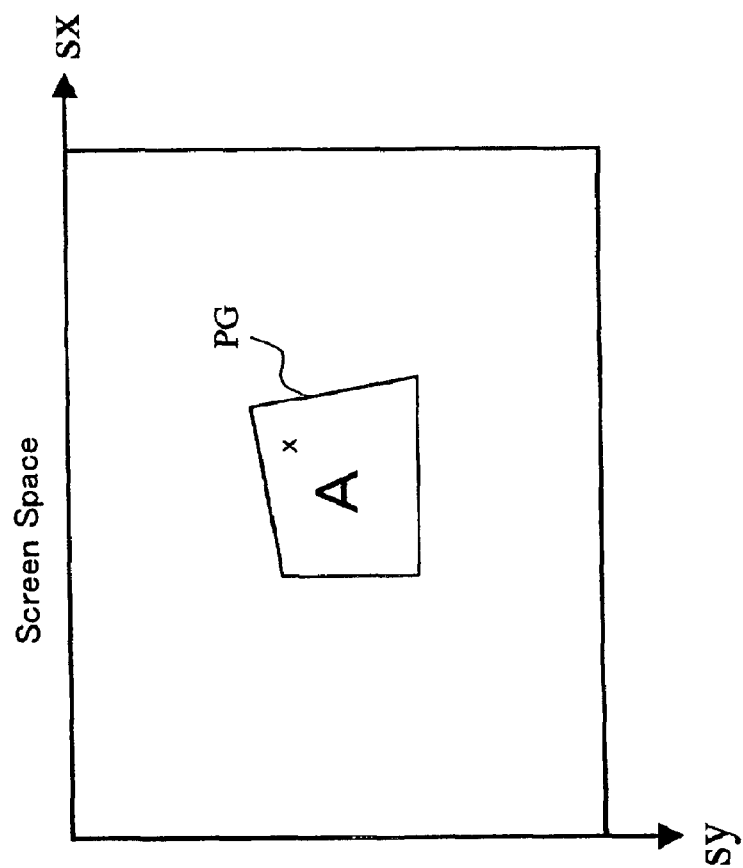
Figure 2:
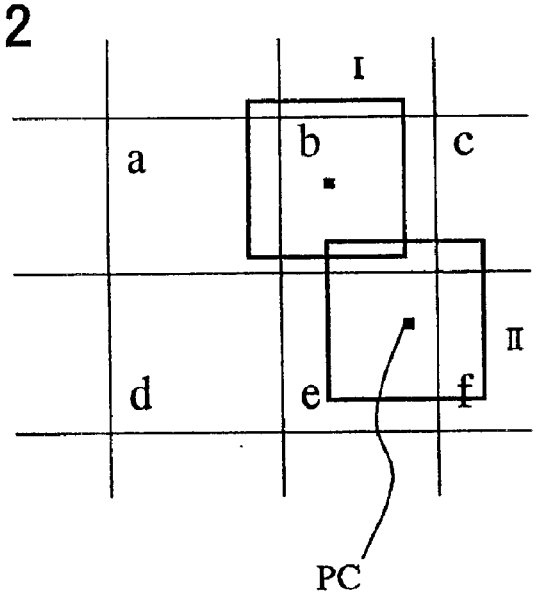
FIG. 2 is a diagram for explaining a bilinear filtering.
Figure 3A:
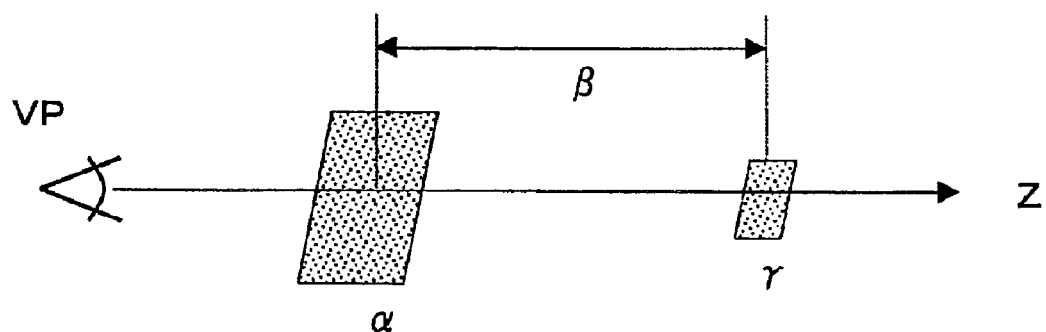
FIGS. 3A, 3B and 3C are diagrams for explaining a distance from a view point and a polygon display.
Figure 3B:
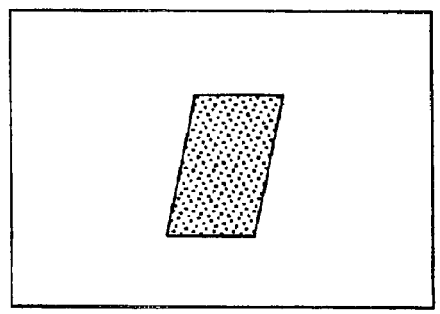
Figure 3C:
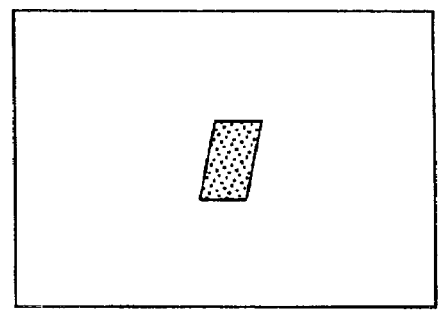
Figure 4:
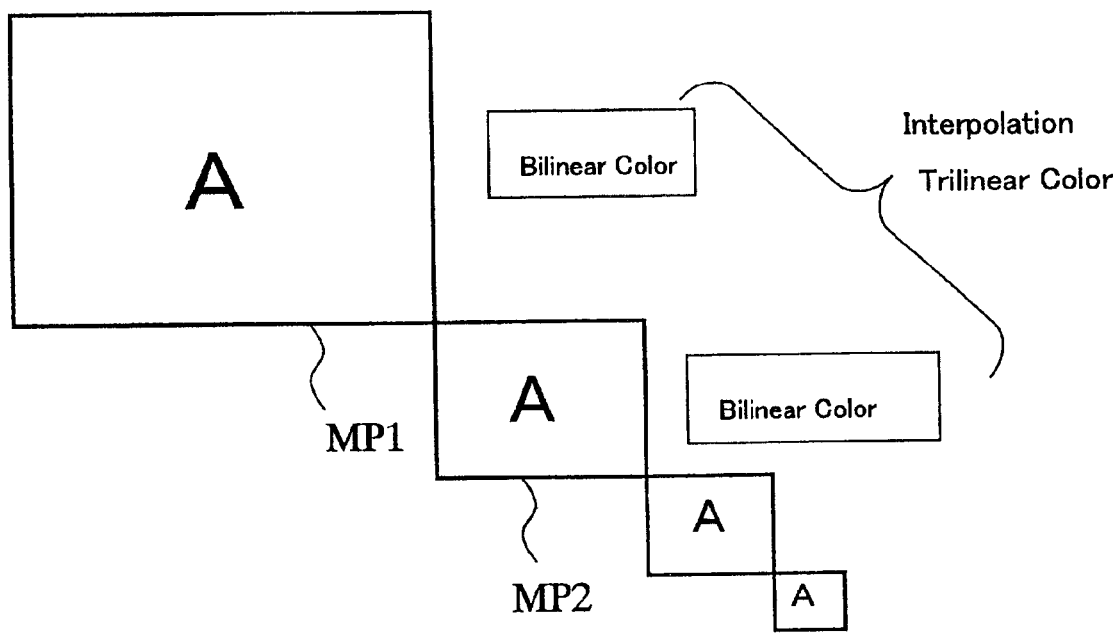
FIG. 4 is a diagram for explaining a texture mipmap structure.
Figure 5:
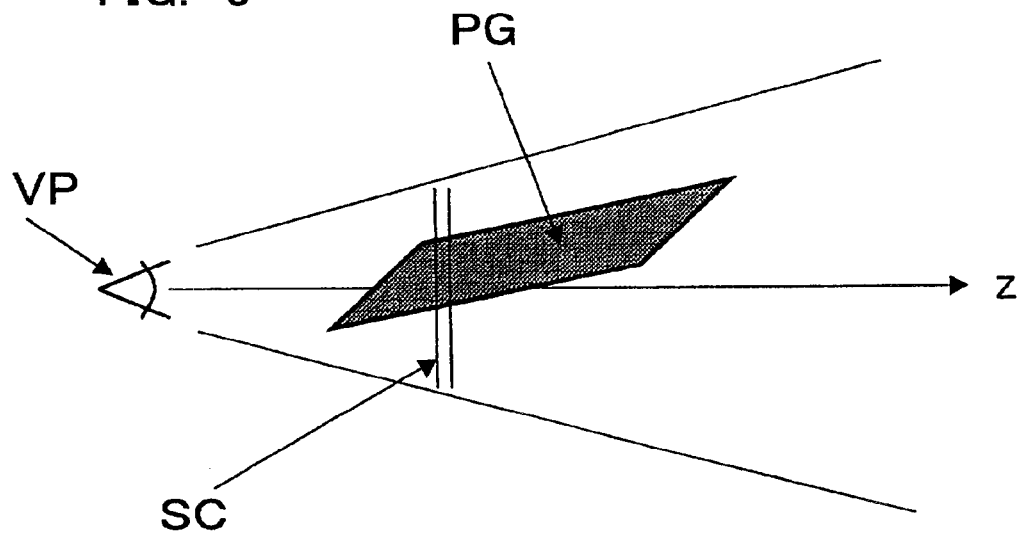
FIG. 5 is a diagram for explaining the case where a polygon PG to which a texture is stuck is inclined to a screen SC.

An embodiment of the present invention will now be described with reference to the drawings. In this connection, in the drawings, the description is made by attaching the same reference numerals or reference symbols to the same or like elements.

Figure 6:
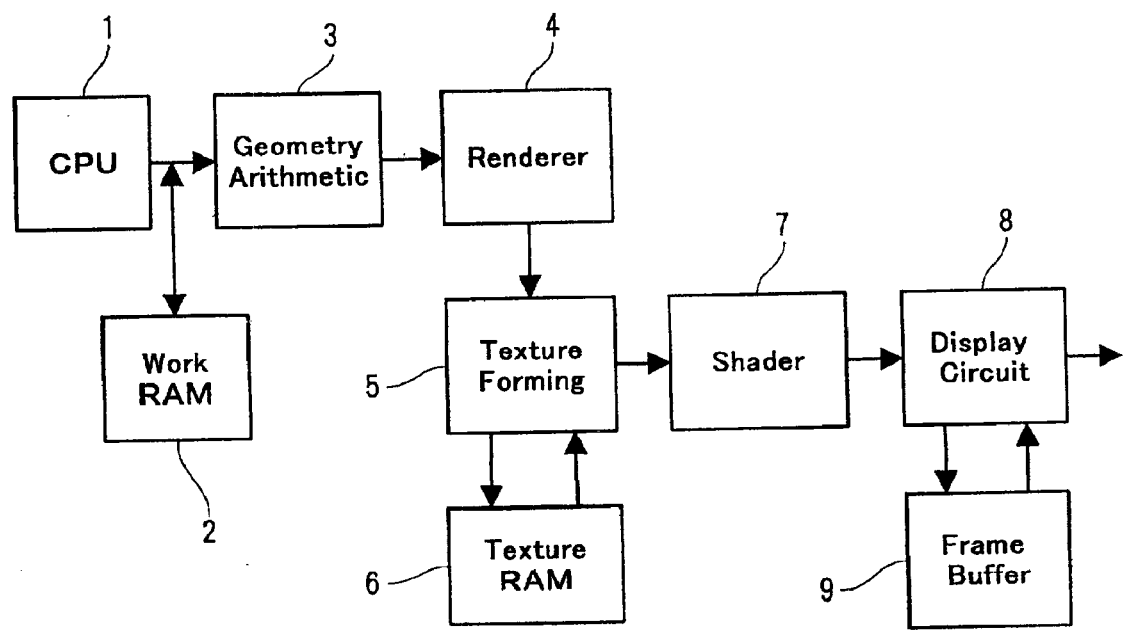
FIG. 6 is a block diagram of a structural example of an image processing apparatus by generic computer graphics to which the present invention is applied.

FIG. 6 is a structural example block diagram of an image displaying apparatus by generic computer graphics to which the present invention is applied.

A program for processing an image is controlled by a CPU 1. The program, or data, and a display list for use in the CPU 1 is stored in a work memory 2.

Figure 7:
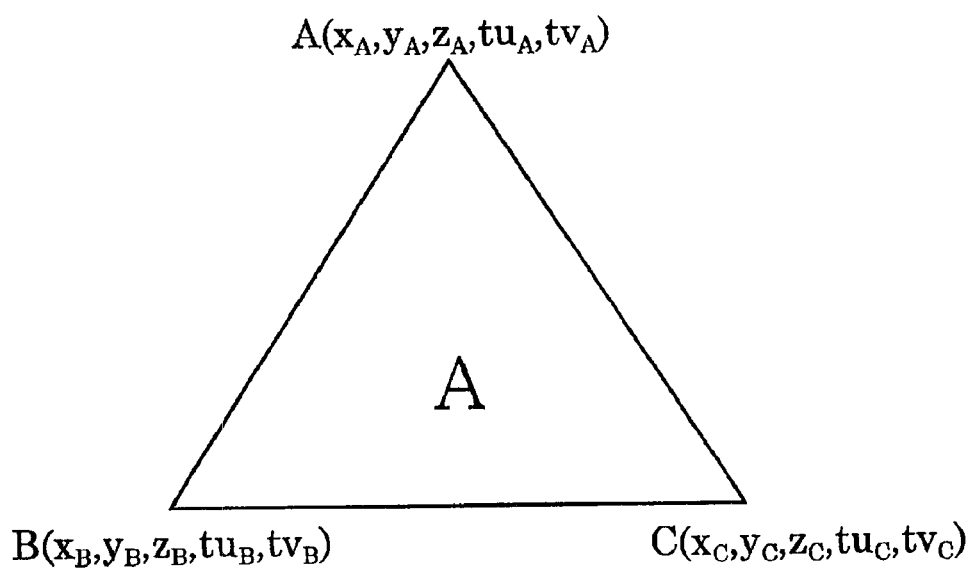
FIG. 7 is a diagram showing one example of polygon data as three-dimensional object data of world coordinates.
Figure 8:
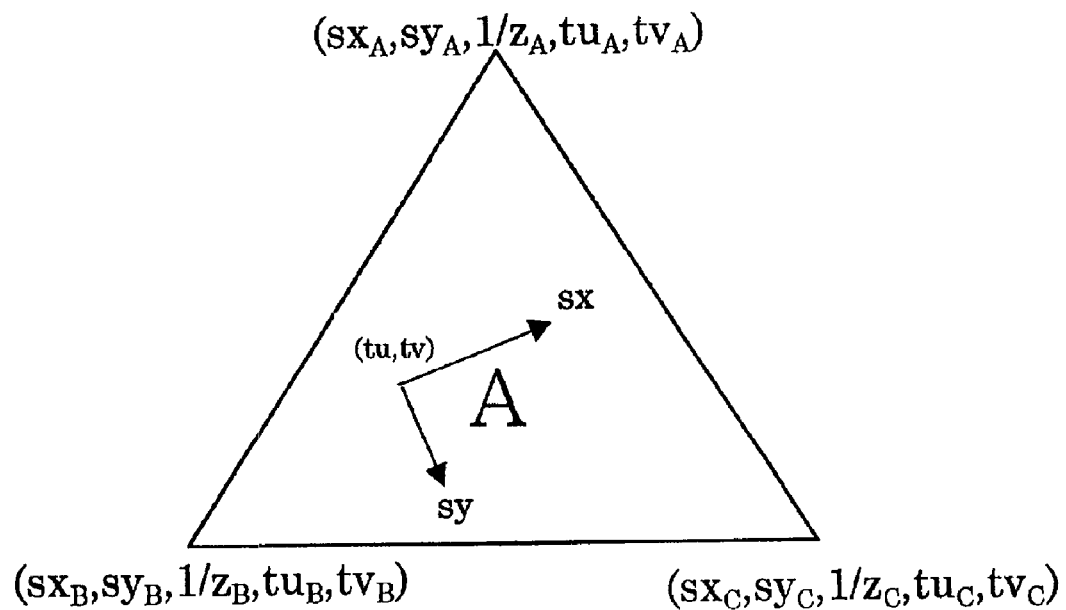
FIG. 8 is a diagram in which the polygon data of FIG. 7 are perspective-transformed to data of a view point coordinates system with the view point as the origin.

In a geometry arithmetic block 3, polygon data (hereinafter referred to as merely polygon data) as three-dimensional object data of world coordinates, shown as one example in FIG. 7, are read out of the work memory 2 to be input, under control of the CPU 1. Next, as shown in FIG. 8, a perspective transformation is performed to data of a view point coordinates system in which a view point is the origin.

The polygon data processed: in the geometry arithmetic block 3 are led to a renderer 4. In the renderer 4, data on a polygon-by-polygon basis are transformed to data on a pixel-by-pixel basis.

The data on a pixel-by-pixel basis are next input to a texture forming block 5, and here based on texture data to be stored in a texture RAM 6, a texture color on a pixel-by-pixel is formed.

A shader block 7 shades the polygon to which the texture color formed by the texture forming block 5 is pasted according to a normal line vector, etc. on a pixel-by-pixel basis.

A display circuit 8 writes image data from the shader block 7 into a frame buffer 9, or repeatedly controls a readout and executes control of displaying images on a monitor (not shown).

In such the image displaying apparatus, the present invention is realized and parts having characteristic are in particular the renderer 4 and texture forming block 5.

Figure 9:
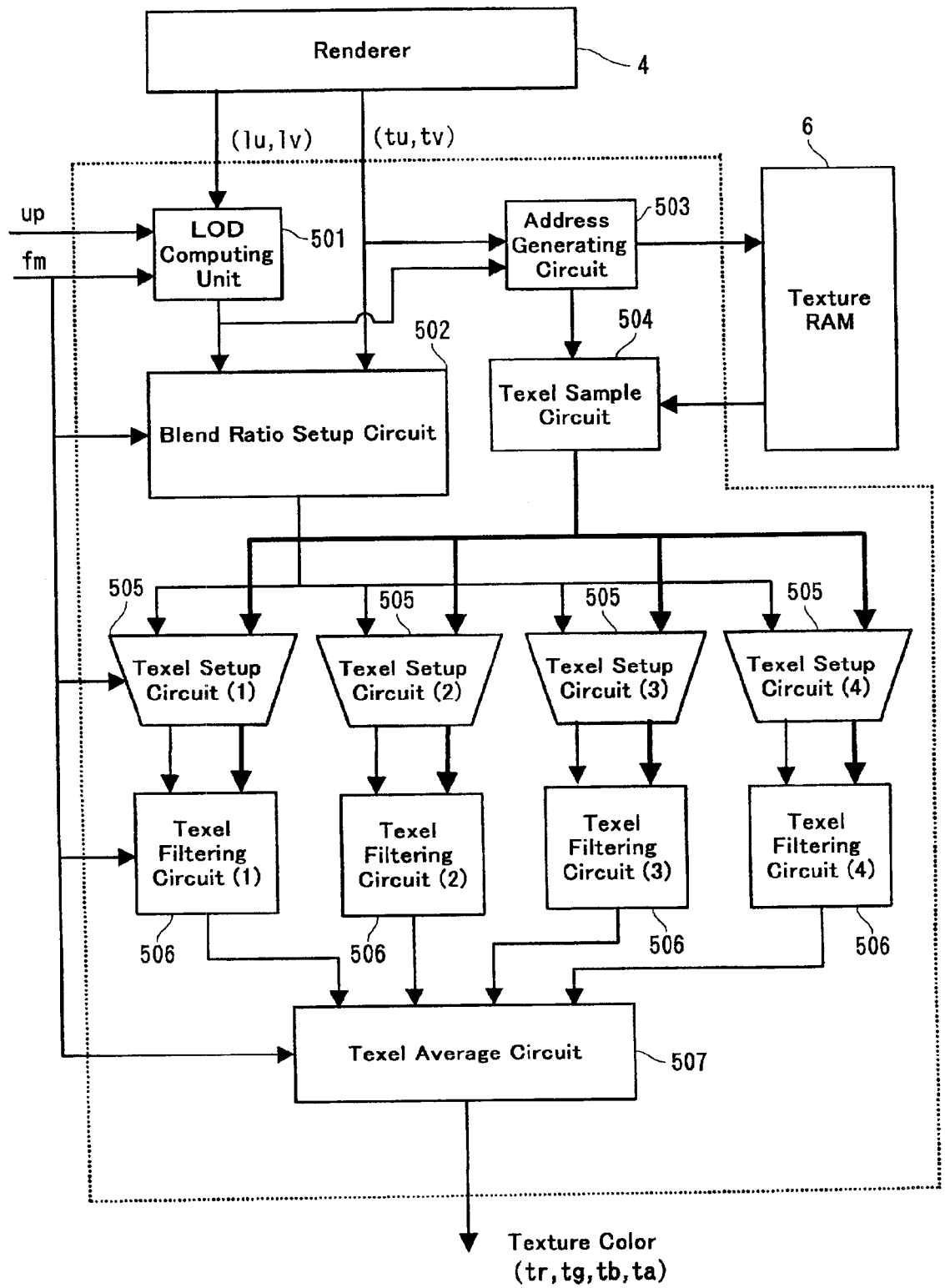
FIG. 9 is a block diagram showing a configuration of an embodiment of a staple part of a renderer 4 and a texture forming block 5 in which the present invention is realized.
Figure 10:
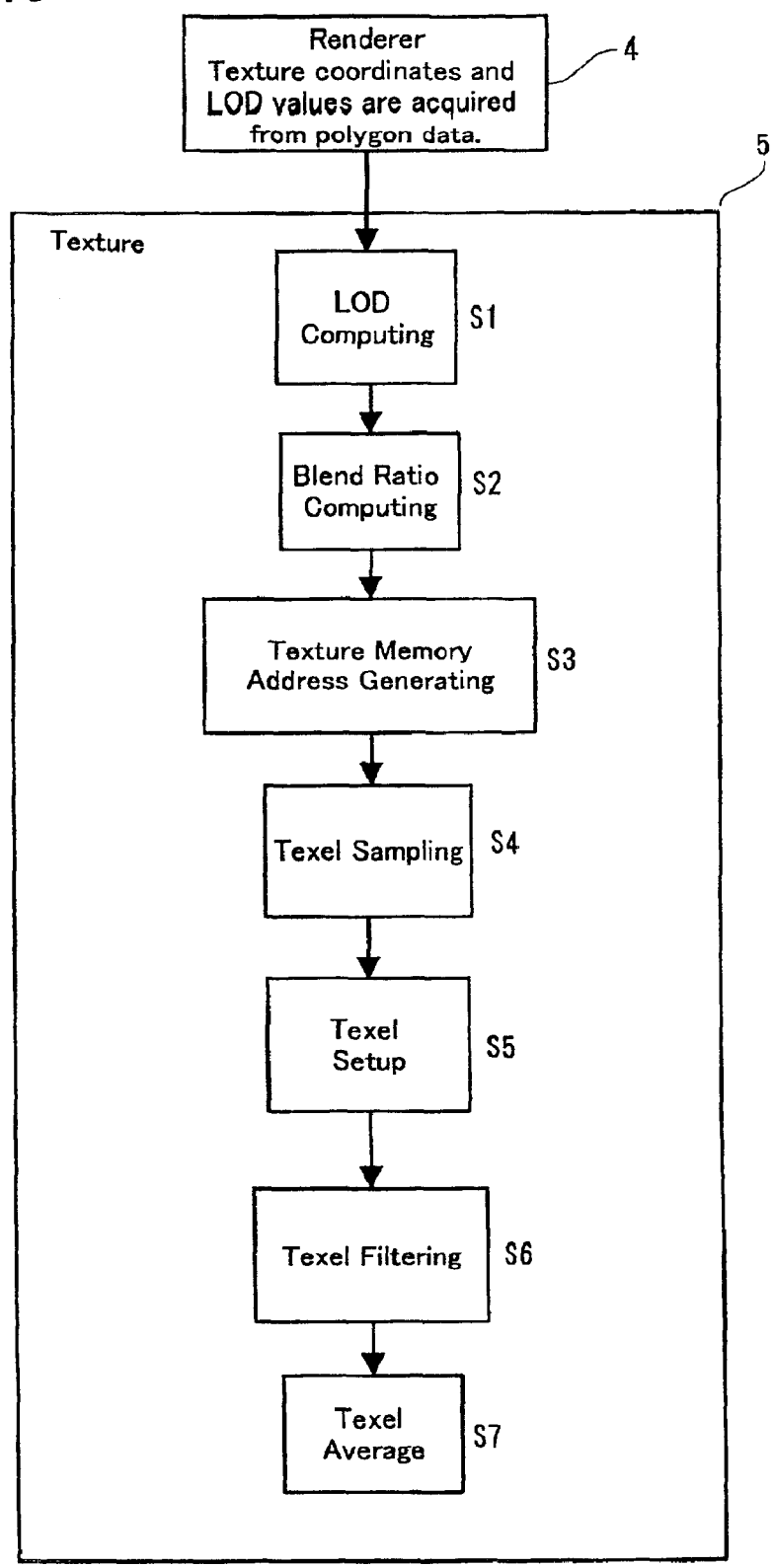
FIG. 10 is an operation flowchart shown centering operation of the texture forming block 5 in response to FIG. 9.

FIG. 9 is a block diagram showing an embodiment configuration of a staple part of the renderer 4 and texture forming block 5 to be realized according to the present invention. FIG. 10 is an operating flowchart shown centering operations of the texture forming block 5 in response to FIG. 9.

The renderer 4 inputs three-dimensional coordinates polygon data (FIG. 8) which are perspective-transformed with a view point as the origin from polygon data (FIG. 7) of world coordinates in the geometry arithmetic block 3.

The polygon data have the three-dimensional coordinates, texture coordinates, normal line vector, etc. in each of vertexes A, B, C of a polygon as vertex data as shown in FIG. 7.

As an example of vertex data, the respective three-dimensional coordinates ($x_A$ to $_C$, $y_A$ to $_C$, $z_A$ to $_C$) and texture coordinates ($tu_A$ to $_C$, $tv_A$ to $_C$) are shown, in particular, in relation to the present invention at the vertexes A, B, C.

In the renderer 4, these vertex data are sequentially interpolated to operate texture coordinates (tu, tv) of a polygon on a pixel-by-pixel basis. Furthermore, detail LOD values of the polygon are acquired in u and v directions.

Figure 11:
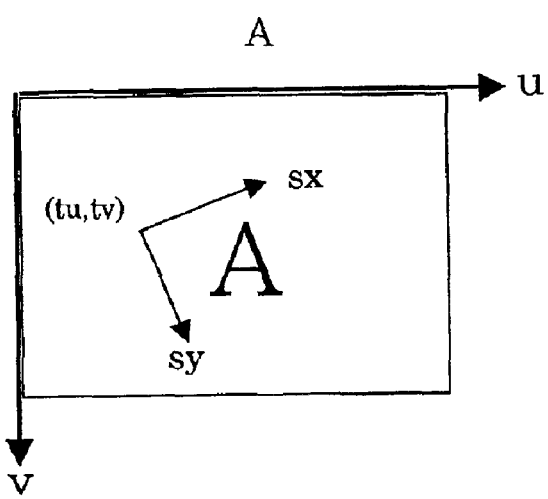
FIG. 11 is a diagram for explaining a method for acquiring details LOD values.
Figure 11:
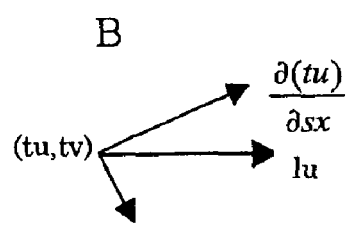
Figure 11:
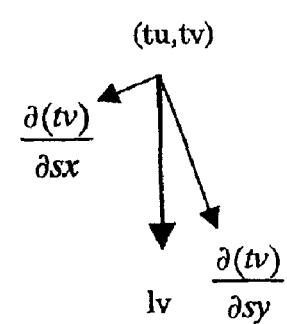

Here, the detail LOD values (lu, lv) of the polygon in the u and v directions are acquired as follows:

In FIG. 8, (sx, sy) is screen coordinates. In FIG. 11A, a pixel of the screen coordinates is shown so as to correspond to the texture coordinates (tu, tv) in texture coordinates system (u, v)

A differential amount (lu) in the u direction and a differential amount (lv) in the v direction of the texture coordinates (tu, tv) are detail LOD values (lu, lv) to be acquired. Namely, a differential amount of the texture coordinates with respect to screen coordinates (sx, sy) is acquired.

If this is described with reference to FIG. 11B, FIG. 11B represents the differential amount lu in the u direction of the texture coordinates (tu, tv) with the amount of differential $\partial(tu)/\partial sx$ in an sx direction on the screen coordinates and with the amount of differential $\partial(tu)/\partial sy$ in an sy direction.

On the other hand, the differential amount lv in the v direction of the texture coordinates (tu, tv) is represented, as shown in FIG. 11C, with the amount of differential $\partial(tv)/\partial sx$ in an sx direction of the screen coordinates, and with the amount of differential $\partial(tv)/\partial sy$ in an sy direction.

Furthermore, as an embodiment, a larger one of $\{\partial(tu)/\partial sx, \partial(tu)/\partial sy\}$ is selected as the differential amount lu in the u direction of the texture coordinates (tu, tv).

Similarly, as the differential amount lv in the v direction of the texture coordinates (tu, tv), a larger one of $\{\partial(tv)/\partial sx, \partial(tv)/\partial sy\}$ is selected for use.

Since a mipmap is structured by the size of the second power, it is represented by $\log_2$, to be set as detail LOD values (lu, lv).

In this connection, on the contrary as the embodiment, it is possible to set so as to select a smaller one.

Both the so-acquired detail LOD values (lu, lv) and texture coordinates values (tu, tv) on a pixel-by-pixel basis are input to the texture forming block 5.

The detail LOD values (lu, lv) are input into a LOD computing unit 501 of the texture forming block 5, and are fine regulated therein by parameters specified by a user. As understood in the later description, as the detail LOD values (lu, lv) affects the size of a final texture filtering domain (dlu, dlv), a user has in advance set them in header information of a texture, thereby fine regulating the detail LOD values (step S1).

Accordingly, the user parameters (up) in which a user intends to fine regulate are input into the LOD computing unit 501. As the parameters to be input, for example, the following parameters exist.

lod_offset:

An offset value (lod_offset) is added up to the input detail LOD values (lu, lv). lod_offset can take a negative value.

mipmap_select_mode:

It is selected whether a mipmap is selected at a greater value of two ones of the LOD values (lu, lv), or whether a mipmap is selected at a smaller value. A filtering domain (dlu, dlv) changes by a method of this mode selection.

lod_clip:

This is a parameter prescribing clipping of the LOD values (lu, lv) in accordance with a parameter mipmap_select_mode of the mipmap selection mode, and this is one for selecting as to whether or not a plurality of values (here, tow values of lu, lv) of the LOD values are unified to any one.

That is, lod_clip:

In the case of a selection that the plurality of values of the LOD values are unified to any one, in the case of a mode that mipmap_select_mode selects a mipmap at a greater value of two ones of the LOD values (lu, lv), a smaller value is set to the greater one of the values (lu, lv). On the contrary, in the case of a mode that mipmap_select_mode selects a mipmap at a smaller value, a greater value is set to the smaller one of the values (lu, lv). In any case, a filtering domain becomes isotropic.

Here, a concrete example of the mipmap selection by the LOD values (lu, lv) will be described in FIG. 12. A size of the mipmap is reduced at the second power. Accordingly, as described previously, the LOD values (lu, lv) are represented by $\log_2$.

Figure 12:
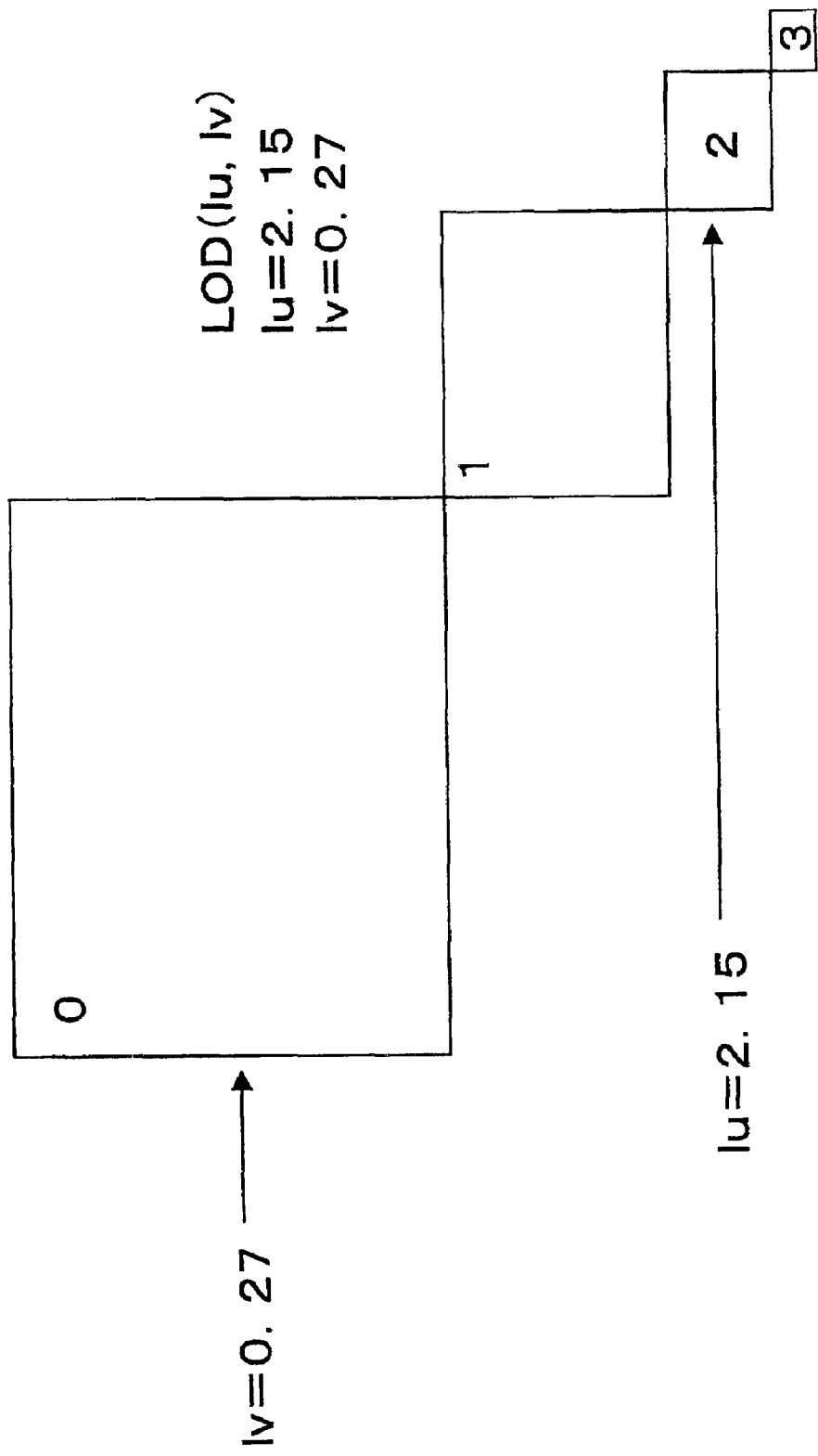
FIG. 12 is a diagram for explaining a concrete example of a mipmap selection by the details LOD values.

Now, if lu=2.15, lv=0.27, and mipmap_select_mode= large, digits 2, 0 at a first place of lu, lv denote mipmaps 2, 0 of FIG. 12, respectively. Furthermore, digits 15, 27 of a radix point or less denote the size of a filtering domain in the corresponding mipmap.

According to the embodiment of the present invention, the mipmap having a large details level is selected. Namely, the mipmap 2 is selected in response to lv=2.15 in the above example.

The LOD values (lu, lv) are modified in a LOD computing unit 501 by use of the parameters explained above. Furthermore, filtering_mode parameters (fm) are input into the LOD computing unit 501.

This parameter is a flag for determining by use of how many texels a texture color (tr, tg, tb, ta: including RBG and a values of transparency, etc.) is acquired, and the following selection can be made:

Case 1 . . . A texture color is acquired from one texel.

Case 2 . . . A texture color is acquired from four texels.

Case 3 . . . A texture color is acquired from nine texels.

A final filtering domain (dlu, dlv) is determined in response to each mode.

Here, in the case of the above case 1, it is a point sampling, the filtering domain (dlu, dlv) is insignificant.

In the case of the case 2, this is the case where the filtering domain is set as a domain of 2×2 texel (four-point sampling), and (dlu, dlv) becomes the size of 0.0 to 1.0.

In the case of the case 3, this is the case where the filtering domain is set as a domain of 3×3 texel (nine-point sampling), and (dlu, dlv) becomes the size of 0.0 to 1.99.

Here, a relationship between the above parameters and the filtering domain is shown in the following table by arrangement with the LOD values (lu, lv)=(2.15, 0.27) as an example.

TABLE 1

| Mipmap_select=large (selection of mipmap of 2) | | Mipmap_select=small (selection of mipmap of 0) | |
| --- | --- | --- | --- |
| lod_clip=OFF | lod_clip=ON | lod_clip=OFF | Lod_clip=ON |
| Four-point Sampling (fm=case 2) | | | |
| dlu=1.15 dlv=1.27 ≫2 ↓ dlu=1.00 dlv=0.3175 (non-isotropic) | dlu=1.15 dlv=1.15 ↓ dlu=1.00 dlv=1.00 (isotropic) | dlu=1.15 ≪2 dlv=1.27 ↓ dlu=1.00 dlv=1.00 (isotropic) | Dlu=1.27 Dlv=1.27 ↓ dlu=1.00 dlv=1.00 (isotropic) |
| Nine-point Sampling (fm=case 3) | | | |
| dlu=1.15 dlv=1.27 ≫2 ↓ dlu=1.15 dlv=0.3175 (non-isotropic) | dlu=1.15 dlv=1.15 ↓ dlu=1.15 dlv=1.15 (isotropic) | dlu=1.15 ≪2 dlv=1.27 ↓ dlu=1.99 dlv=1.27 (non-isotropic) | Dlu=1.27 Dlv=1.27 ↓ dlu=1.27 dlv=1.27 (isotropic) |

As described previously, in the above table, a number of the mipmap selected by an integral of (lu, lv) is designated, and a value in which 1.0 is added up to a fraction becomes a filtering domain. In the above example, as lu=2.15, the mipmap of a number 2 is designated, and as lv=0.27, the mipmap of a number 0 is designated.

Furthermore, in Table 1, at the time of mipmap_select_ mode=large, a texture mapping is performed referencing a texture of LOD=2. At that time, in the case of lod_clip=ON, the filtering domain does not change, but in the case of lod_clip=OFF, the filtering domain changes.

For this reason, for example, in the four-point sampling, at the time of lod_clip=OFF, as the LOD value in lv is LOD=0 from lv=0.27, in order to set to LOD=2 as a reference, in proportion to a difference in the mipmap (2−0=2 steps in the above example), i.e. the filtering domain dlv=1.27 is shifted rightwardly by 2 bits (division by four).

In this connection, in the above table, symbol "≫" denotes a two-bit right shift, and symbol "≪" denotes a two-bit left shift.

The other cases are similar, and as shown by symbol "≫" or symbol "≪", the filtering domain is transformed by the two-bit right shift or two-bit left shift.

Furthermore, as a weighted average is disabled exceeding the filtering domain of 1.00 in the four-point sampling, in the case of a value exceeding 1.00, the value is clipped to 1.00. In the case of the nine-point sampling, the weighted average in the range of 0.00 and 1.99 is enabled. For this reason, in the case of mipmap_select_mode=small and lod_clip= OFF, a value of dlu is clipped to 1.99.

Return to FIG. 9 for explanation, an output of the LOD computing unit 501 is input to a blend ratio setup circuit 502. Here, receiving the filtering domain (dlu, dlv) and the texture coordinates (tu, tv) from the renderer 4, a blend ratio for making a weighted average of the texel is acquired (step S2).

Simultaneously, the texels except the domain are decided from a center of the filtering domain and the size of the filtering domain and are excepted from an object of the weighted average.

Figure 13:
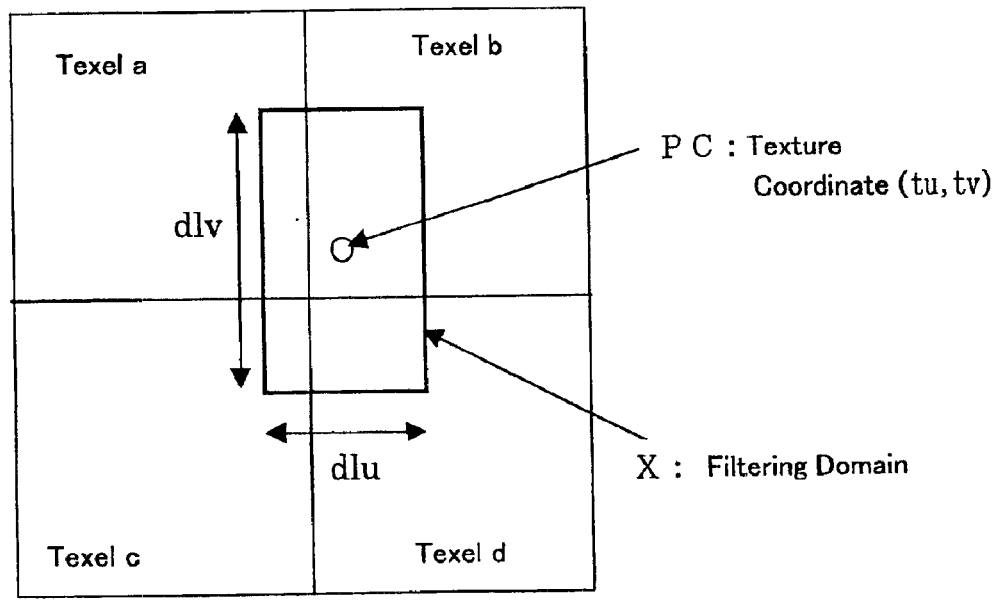
FIG. 13 is a diagram (No. 1) showing an example of a filtering domain in the case where a texture color is acquired from 4 (2×2) texels.
Figure 14:
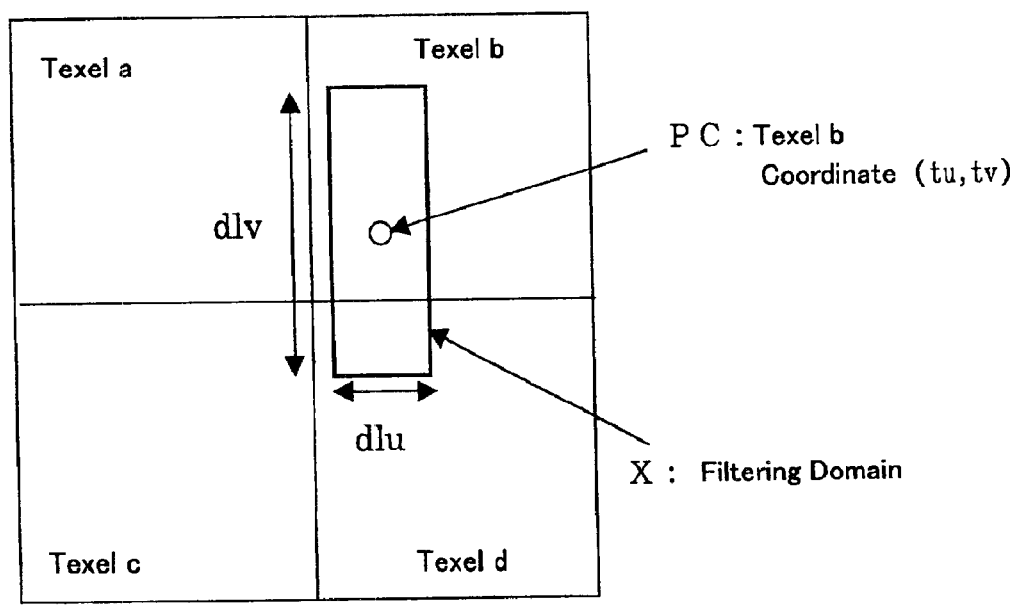
FIG. 14 is a diagram (No. 2) showing an example of the filtering domain in the case where the texture color is acquired from 4 (2×2) texels.

Here, the filtering domain will further be described. FIGS. 13 and 14 are diagrams showing an example of the filtering domain in the case of acquiring a texture color from 4 (=2×2) texels.

In the example of FIG. 13, the texture coordinates (tu, tv) are at a center PC, and a domain containing texels a to d is a filtering domain X. It is not a square in response to the size of the filtering domain (dlu, dlv).

In the example of FIG. 14, the texture coordinates (tu, tv) are at a center PC, and a domain containing texels b, d is a filtering domain X, and the texels a, c are except the filtering domain in the case of acquiring the texture color.

Figure 15:
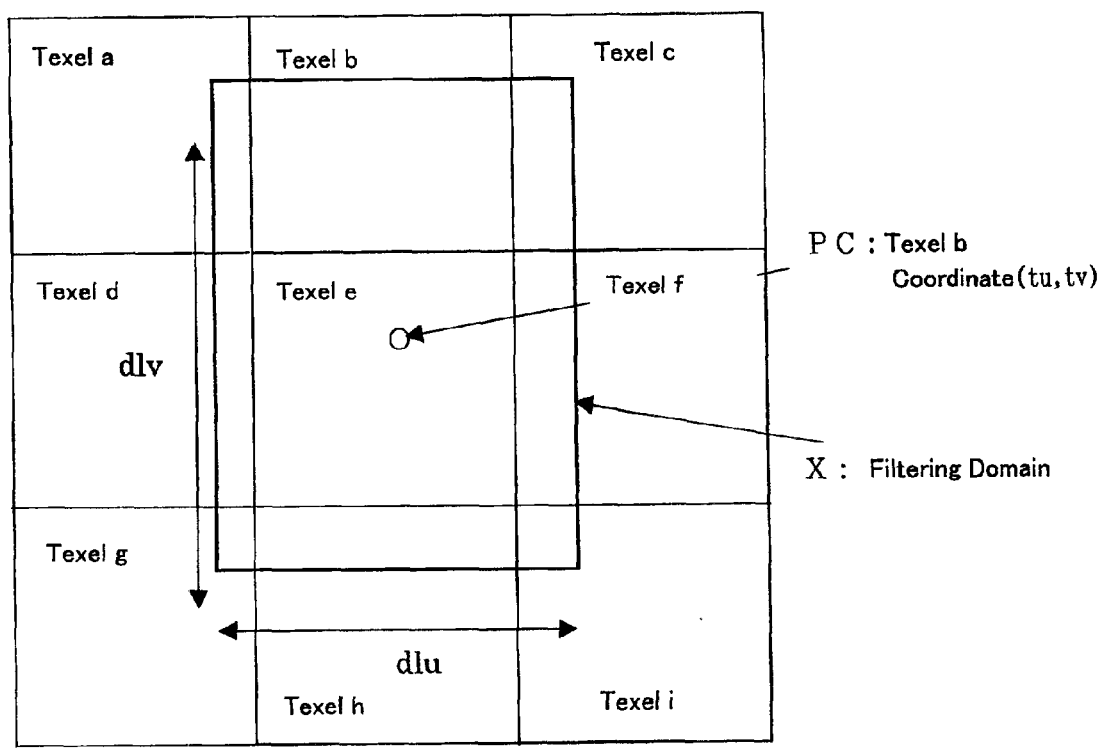
FIG. 15 is a diagram (No. 1) showing an example of the filtering domain in the case where the texture color is acquired from 9 (3×3) texels.
Figure 16:
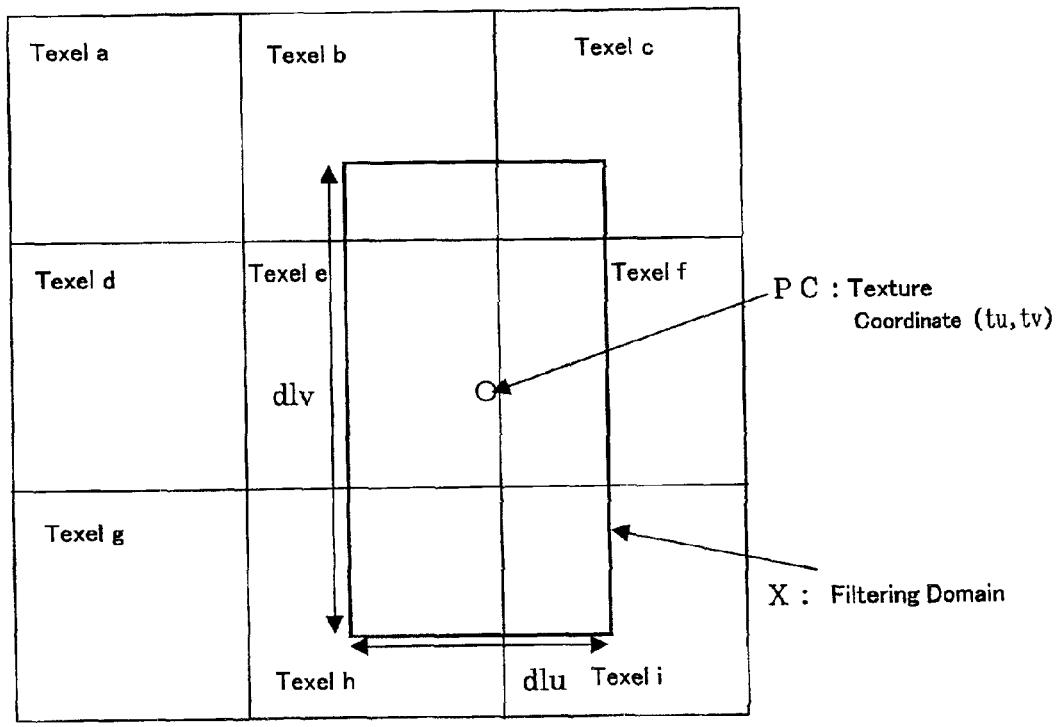
FIG. 16 is a diagram (No. 2) showing an example of the filtering domain in the case where the texture color is acquired from 9 (3×3) texels.

FIGS. 15 and 16 are diagrams showing an example of the filter domain in the case of the case 3 in the case of acquiring the texture color from 9 (=3×3) texels.

In the example of FIG. 15, the texture coordinates (tu, tv) are at a center PC, and a domain containing texels a to i is the filtering domain X. It is not a square in response to the filtering domain (dlu, dlv), here too.

In the example of FIG. 16, the texture coordinates (tu, tv) are at a center PC, and a domain containing texels b, c, e, f, h, i is the filtering domain X, and the texels a, d, g are except the filtering domain in the case of acquiring the texture color.

An output of the blend ratio setup circuit 502 comprises decision flags (cu0, cv0) to (cu1, cv1) and blend ratios (bu0, bv0) to (bu1, bv1).

As the embodiment, decision flags (cu0, cv0) to (cu1, cv1) are ones indicating a state of each one bit, and blend ratios (bu0, bv0) to (bu1, bv1) are each a 8-bit value (256 gradations).

Figure 17:
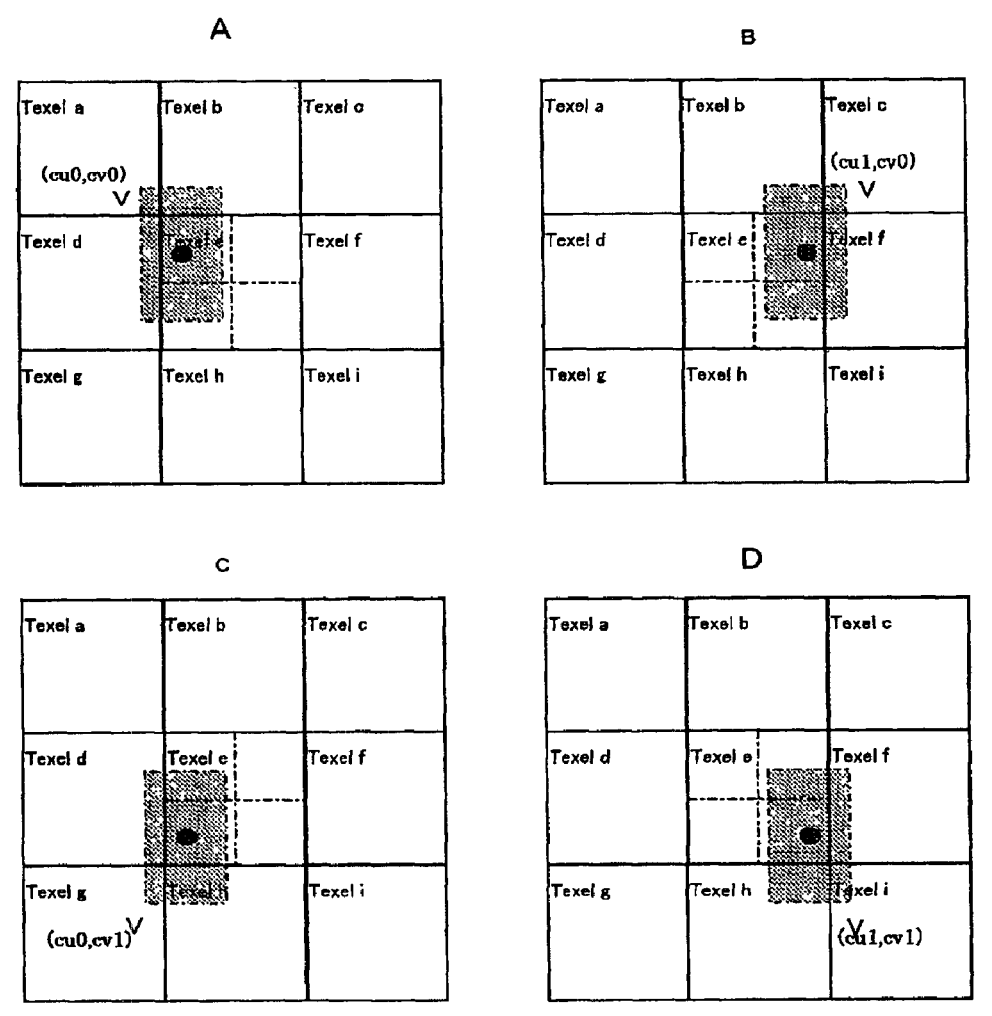

Here, a method for determining a decision flag in the case of the case 2 (4-texel sampling) will be explained in FIG. 17.

As shown in FIG. 17A, four texels out of nine texels containing a texel e in which a center of the filtering domain X (a domain enclosed with a broken line in FIG. 17A) exists are read out of a texture RAM 6.

At this time, a method for selecting the decision flags (cu0, cv0) to (cu1, cv1) is different according to at which position the center of the filtering domain exits within the texel e.

As shown in FIG. 17A, in the case where the center of the filtering is positioned left-up in the texel e, the filtering domain is entered into the four texels of the texels a, b, d, e. For this reason, referring to the flag of (cu0, cv0), the texel for use in the filtering domain is decided.

As shown in FIG. 17A, in the case where an vertex V of the filtering domain X exists in the texel a, the decision flag (cu0, cv0) is indicated as (1, 1). Furthermore, in the case where the vertex V exists in the texel b, indicated as (0, 1), and in the case where the vertex V exists in the texel d, indicated as (1, 0), and further in the case where the vertex V exists in the texel e, indicated as (0, 0).

Furthermore, in a combination of the other decision flags, the method is also same, and it will be explained by the following exampls:

Namely, in the case where the center of the filtering domain exists right-up in the texel e, as shown in FIG. 17B, as the filtering domain is entered into the four texels of the texels b, c, e, f, the decision flag becomes (cu1, cv0).

As shown in FIG. 17B, in the case where the vertex V of the filtering domain X exists in the texel c, the decision flag (cu1, cv0) is indicated as (1, 1), and in the case where the vertex V exists in the texel b, indicated as (0, 1), and in the case where the vertex V exists in the texel f, indicated as (1, 0), and in the case where the vertex V exists in the texel e, indicated as (0, 0).

Similarly, in the case where the center of the filtering domain exists left-down in the texel e, as shown in FIG. 17C, as the filtering domain is entered into the four texels of the texels d, e, g, h, the decision flag becomes (cu0, cv1).

At this time, as shown in FIG. 17C, in the case where the vertex V of the filtering domain X exists in the texel g, the decision flag (cu0, cv1) is indicated as (1, 1), and in the case where the vertex V exists in the texel h, indicated as (0, 1), and in the case where the vertex V exists in the texel d, indicated as (1, 0), and in the case where the vertex V exists in the texel e, indicated as (0, 0).

Furthermore, in the case where the center of the filtering domain exists right-down in the texel e, as shown in FIG. 17D, as the filtering domain is entered into the four texels of the texels e, f, h, i, the decision flag becomes (cu1, cv1).

Here, as shown in FIG. 17D, in the case where the vertex V of the filtering domain X exists in the texel i, the decision flag (cu1, cv1) is indicated as (1, 1), and in the case where the vertex V exists in the texel h, indicated as (0, 1), and in the case where the vertex V exists in the texel f, indicated as (1, 0), and in the case where the vertex V exists in the texel e, indicated as (0, 0).

Figure 18:
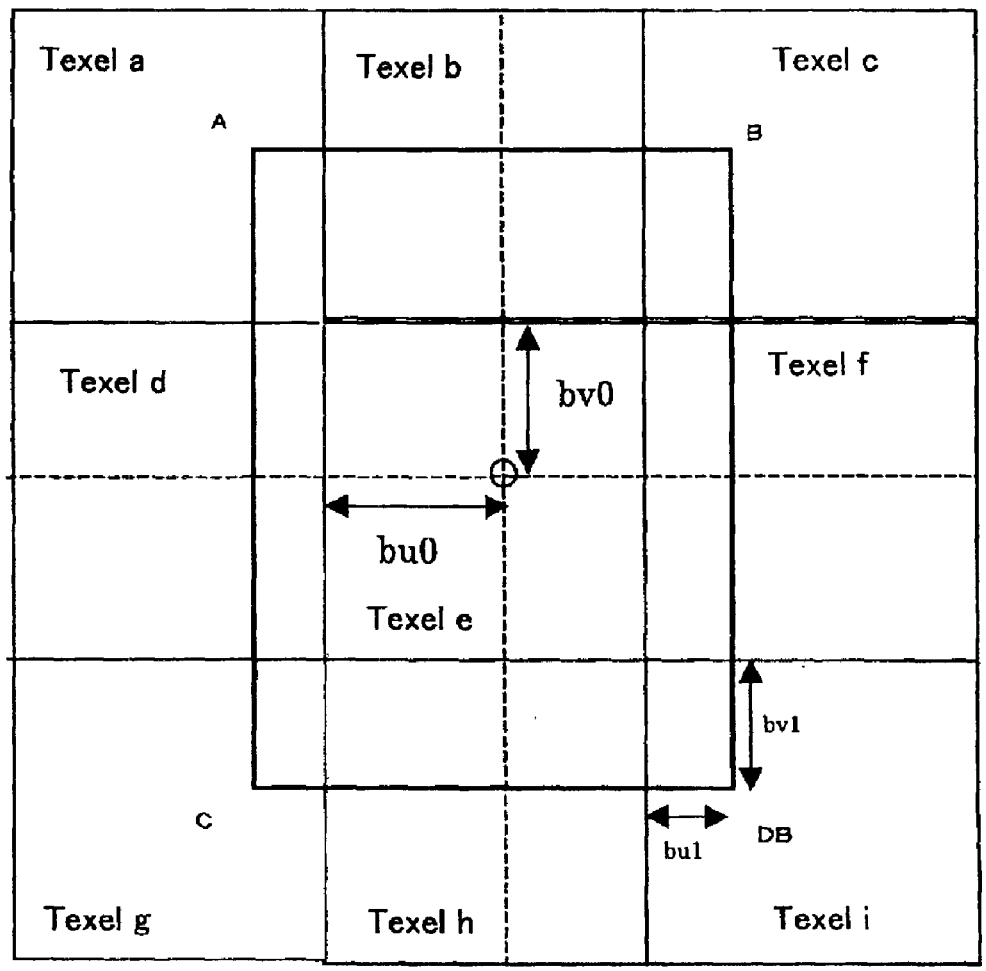
FIG. 18 is a diagram for explaining a method for determining the decision flag in the case where a filtering domain is determined from 9 (3×3) texels.

Next, in FIG. 18, the case of the case 3 will be considered, i.e. the case where the filtering domain X is determined from 9 (=3×3) texels will be determined.

When divided into four domains by a broken line passing the center coordinates PC, the blend ratio (bu0, bv0) and the decision flag (cu0, cv0) are shown corresponding to a left-up domain of the filtering domain X containing an vertex A. Furthermore, the blend ratio (bu1, bv0) and the decision flag (cu1, cv0) are shown corresponding to a right-up domain of the filtering domain X containing an vertex B, and the blend ratio (bu0, bv1) and the decision flag (cu0, cv1) are shown corresponding to a left-down domain of the filtering domain X containing an vertex C, and the blend ratio (bu1, bv1) and the decision flag (cu1, cv1) are shown corresponding to a right-down domain of the filtering domain X containing an vertex D.

A method for using each decision flag is same with the case of the case 2 described previously based on FIG. 17.

Figure 19:
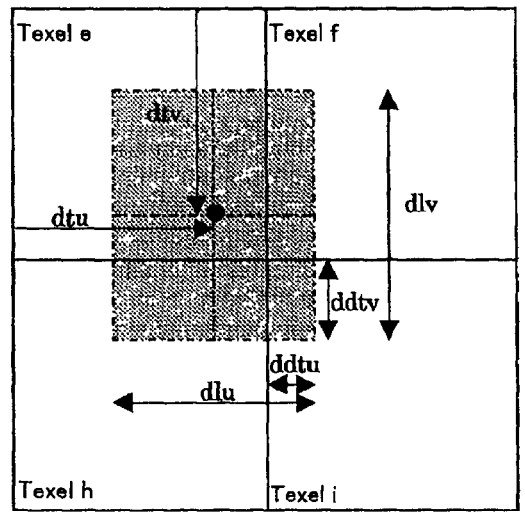
FIG. 19 is a diagram for explaining a method for acquiring a blend ratio at the time of 4-texel sampling.

Here, a process of acquiring the blend ratios (bu0, bv0), (bu1, bv1) from (dlu, dlv) of the filtering domain X will be described. FIG. 19 is a diagram for explaining a method for acquiring the blend ratio at the time of four-texel sampling.

In FIG. 19, (dtu, dtv) is a fraction of the texture coordinates (tu, tv). (bu1, bv1) is shown as follows:

ddtu=dtu+(dlu/2)−1.0
ddtv=dtv+(dlv/2)−1.0
bu1=ddtu/dlu
bv1=ddtv/dlv

Figure 20:
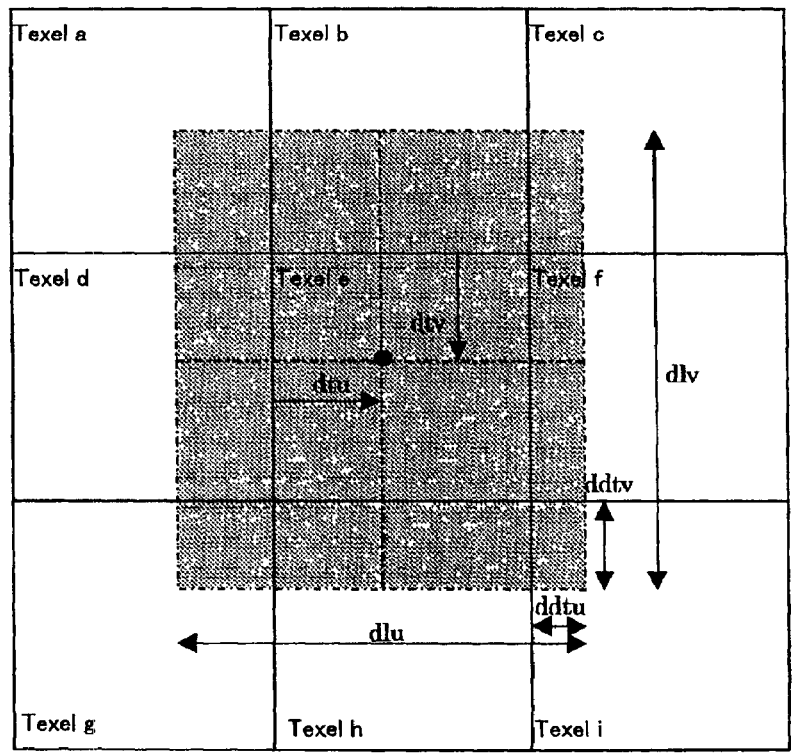
FIG. 20 is a diagram for explaining a method for acquiring the blend ratio at the time of 9-texel sampling.

Furthermore, a method for acquiring the blend ratio at the time of 9-texel sampling will be described in FIG. 20. In FIG. 20, (dtu, dtv) is a fraction of the texture coordinates (tu, tv). (bu0, bv0) is shown as follows:

ddtu=dtu
ddtv=dtv
bu0=ddtu/(dlu/2)
bv0=ddtv/(dlv/2)

Furthermore, (bu1, bv1) is shown as follows:

ddtu=dtu+(dlu/2)−1.0
ddtv=dtv+(dlv/2)−1.0
bu1=ddtu/(dlu/2)
bv1=ddtv/(dlv/2)

Returning to FIG. 9, the texture coordinates (tu, tv) out of outputs of the renderer 4 are input into an address generating circuit 503. Furthermore, the LOD values fine regulated are input from the LOD computing unit 501.

Here, based on the texture coordinates (tu, tv) and the fine regulated LOD values, a real address of the texture RAM 6 is formed (step S3). The real address of the texture RAM 6 formed thereby is fed to the texture RAM 6, and it is possible to access in order to read out the nine corresponding texels centering the texture coordinates (tu, tv).

Furthermore, the address formed by the address generating circuit 503 is fed to a texel sample circuit 504. The texels (one sample in the case 1, four samples in the case 2, and nine texel samples in the case 3) in a predetermined range corresponding to the cases 1 to 3 centering the address read out of the texel sample circuit 504 and texture RAM 6 are obtained (step S4).

As described above, an output (the blend ratio and decision flag) from the blend ratio setup circuit 502 and an output of the texel sample circuit 504 are input into four sets of texel setup circuit 505(1) to 505(4). Here, a setup of the texels is carried out (step S5).

The texel setup circuits 505(1) to 505(4) are constituted by selector circuits, and the texel setup circuits 505(1) to 505(4) receive the blend ratios (bu0, bv0) to (bu1, bv1) and the decision flags (cu0, cv0) to (cu1, cv1) from the blend ratio setup circuit 502, and receive 1 to 9 texels from the texel sample circuit 504. At this point of time, the texels are arranged in order stored in a memory.

The texels are rearranged to 1, 4, 9 texels in response to the above filtering_mode. Namely, in the case where filtering_mode is the case 2, as shown in FIGS. 13 and 14, four texels are arranged. In the case where filtering_mode is the case 3, as shown in FIGS. 15 and 16, nine texels are arranged.

Furthermore, the unnecessary texels are excluded based on the decision flags (cu0, cv0) to (cu1, cv1). Namely, in the example of FIG. 14, the texel a and texel c are excluded. In the example of FIG. 16, the texel a, texel d, and texel g are excluded.

The four sets of texel filtering circuits 506(1) to 506(4) acquire a weighted average of the four texels, respectively (step S6).

The texel filtering circuits 506(1) to 506(4) can be structured by interpolators.

In the case where filtering_mode is the case 2, as the texture color is formed from the four texels, the texel filtering circuit 506 may be one. In the case where the texel filtering circuit 506(1) is used, as explained in FIG. 15, the blend ratio (bu0, bv0) and the texels a to d are input from the texel setup circuit 505(1) to the texel filtering circuit 506(1).

Accordingly, the texel filtering circuit 506(1) acquires a weighted average value of the texels a to d in accordance with the blend ratio (bu0, bv0) to be output.

On the other hand, in the case where filtering_mode is the case 3, the texture color is formed from the nine texels. At this time, as described in FIG. 18, a division is made into four domains, and the respective weighted average values are acquired by the texel filtering circuits 506(1) to 506(4).

That is, the blend ratio (bu0, bv0) and the texels a, b, d, e are input into the texel filtering circuit 506(1), in order to acquire weighted average values of the four texels a, b, d, e in accordance with the blend ratio (bu0, bv0).

The blend ratio (bu1, bv0) and the texels b, c, e, f are input into the texel filtering circuit 506(2), in order to acquire weighted average values of the four texels b, c, e, f in accordance with the blend ratio (bu1, bv0).

Furthermore, the blend ratio (bu0, bv1) and the texels d, e, g, h are input into the texel filtering circuit 506(3), in order to acquire weighted average values of the four texels d, e, g, h in accordance with the blend ratio (bu0, bv1).

Furthermore, the texel filtering circuit 506(4) acquires weighted average values of the four texels e, f, h, i in accordance with the blend ratio (bu1, bv1).

In this manner, the four weighted average values computed in the respective domains are output.

Next, a texel average circuit 507 receives four weighted average values output from the texel filtering circuits 506(1) to 506(4).

In the case where filtering_mode is the case 2, the weighted average values of the texel filtering circuit 506(1) are output as texture colors (tr, tg, tb, ta) composed of a components representing RGB components, transparency, or the like.

On the other hand, in the case where filtering_mode is the case 3, receive the four weighted average values of the texel filtering circuits 506(1) to 506(4). The four values are averaged to output the value as the texture colors (tr, tg, tb, ta).

It is possible to realize the filtering circuits 506(1) to 506(4) for realizing such a texel function by an adding circuit for adding the four weighted average values and a shift circuit for shifting by 2 bits in order to divide it by four.

As described in the above embodiment in accordance with the drawings, when the texture colors are formed, it becomes possible to change the filtering domain from the two-dimensional LOD values vertical and lateral to a screen input from the renderer to an appropriate size. Thus, it becomes possible to obtain more beautiful image quality than a conventional bilinear filtering.

Furthermore, this is not a structure of processing the texture colors from two texture maps of a different LOD level unlike a trilinear filtering in the conventional method. Accordingly, color information of low frequency components is not excessively mixed with the texture colors. Thus, image quality of little blurring can be obtained.

Furthermore, as not referring to the texels from the two texture maps of a different LOD level unlike the trilinear filtering, it is possible to restrict the number of times of access to the texture RAM to half the times.

Furthermore, it is possible to provide an image processing method capable of obtaining beautiful filtering results having little blurring even for the polygon which is inclined to a z-axial direction and long to an inclination direction, and an image processing apparatus using the same.

Furthermore, it is possible to fine regulate the LOD values acquired by the computation by a user. Thus, a user can handle the filtering domain.

Furthermore, the above handling can be made at a real time in a process of execution of the image processing apparatus according to the present invention.

It will be appreciated that the above description of the embodiments of the invention is made only for the purpose of understanding the present invention, and that the scope to be protected by the present invention is not limited thereto. Furthermore, any equivalents to those defined in the appended claims are to be included in the scope to be covered by the present invention.

What is claimed is:

1. An image processing method, comprising:

operating from object data on a pixel by pixel basis texture coordinates and LOD (Level of Detail) values expressed with the amount of change in u direction and v direction of texture coordinates;

selecting one mipmap corresponding to the integer part of either u direction or v direction of said LOD value from a plurality of mipmaps stored in a texture memory;

determining a filtering domain of texels read from a texture memory based on values below a decimal point of said LOD values in said selected mipmap; and acquiring a weighted average depending on said texture coordinates and the size of said determined filtering domain to create a texture color to be pasted to pixels of said object data.

2. The image processing method according to claim 1, wherein said step of determining comprises:

adding a predetermined offset to said LOD values.

3. The image processing method according to claim 1, wherein in said step of determining the filtering domain, either u direction or v direction of said LOD values is first selected based on a parameter designating a method of selection of one mipmap from a plurality of mipmaps stored in said texture memory, and then the one of the plurality of mipmaps is selected according to the selected u direction or v direction of said LOD values.

4. The image processing method according to claim 1, wherein at least u direction or v direction of said LOD values is also related to a state of a flag.

5. The image processing method according to claim 3, wherein either u direction or v direction of said LOD values is selected and used for determining the filtering domain, corresponding to the parameter designating a method of selection of one mipmap from a plurality of mipmaps, according to a parameter, which designates whether or not either u direction or v direction of said LOD values is used.

6. An image processing method comprising:
on a pixel-by-pixel basis:
obtaining texture coordinates and a plurality of level of detail (LOD) values from an object data;
determining a filtering domain of texels read from a texture memory based on the LOD values; and
calculating a weighted average based on said texture coordinates and a size of said filtering domain to create a texture color to be pasted to said object;
wherein said step of calculating said weighted average comprises:
acquiring a blend ratio and a decision flag in said filtering domain from said texture coordinates and said filtering domain;
deciding, by said decision flag, texels to be excluded from the weighted average, out of said texels read from said texture memory; and
acquiring the weighted average of said texels in accordance with said blend ratio.

7. The image processing method according to claim 6, wherein said step of determining said filtering domain further includes:
modifying said LOD values with a predetermined parameter and determining a final filtering domain based on a flag indicative of how many texels are to be used to acquire a texture color; and
in case of selecting a mode of four texels by said flag indicative of how many texels are to be used to acquire a texture color, setting said decision flag corresponding to which one of four-divided domains of texels positioned centrally of nine texels contains the center point of said filtering domain.

8. The image processing method according to claim 6, wherein said step of determining said filtering domain further includes:
modifying said LOD values with a predetermined parameter, and determining a final filtering domain based on a flag indicative of how many texels are to be used to acquire the texture color; and
in case of selecting a mode of nine texels by said flag indicative of how many texels are to be used to acquire the texture color, indicating said blend ratio and decision flag correspondingly to four areas into which said nine texels are divided by lines passing through the center of said filtering domain, a first one of said four areas containing the upper left vertex of said filtering domain, a second one of said four areas containing the upper right vertex of said filtering domain, a third one of said four areas containing the lower left vertex of said filtering domain, and a fourth one of said four areas containing the lower right vertex of said filtering domain.

9. The image processing apparatus, comprising:
a circuit for operating upon texture coordinates and LOD (Level of Detail) values expressed with the amount of change in u direction and v direction of texture coordinates on a pixel by pixel basis from object data;
a circuit for selecting one mipmap corresponding to the integrer part of either u direction or v direction of said LOD value from a plurality of mipmaps stored in a texture memory, and determining a filtering domain of texels read from said texture memory based on values below a decimal point of said LOD value in said selected mipmap; and
a circuit for acquiring a weighted average depending on said texture coordinates and the size of said determined filtering domain to create a texture color to be pasted to pixels of said object data.

10. The image processing apparatus according to claim 9, wherein said circuit for determining adds a predetermined offset to said first and second LOD values.

11. The image processing apparatus according to claim 9, wherein said circuit for determining said filtering domain selects one of a plurality of mipmap data stored in a texture memory based on either u direction or v direction of said LOD values.

12. The image processing apparatus according to claim 9, wherein at least either u direction or v direction of said LOD values is also related to a state of a flag.

13. An image processing apparatus comprising:
a circuit for operating upon texture coordinates and LOD (Level of Detail) values expressed with the amount of change in u direction and v direction of texture coordinates on a pixel by pixel basis from object data;
a circuit for selecting one mipmap corresponding to the integer part of either u direction or v direction of said LOD value from a plurality of mipmaps stored in a texture memory, and determining a filtering domain of texels read from said texture memory based on values below a decimal point of said LOD value in said selected mipmap;
a circuit for acquiring a weighted average depending on said texture coordinates and the size of said determined filtering domain to create a texture color to be pasted to pixels of said object data;
a first circuit for acquiring a blend ratio and a decision flag in said filtering domain from said texture coordinates and said filtering domain;
a second circuit deciding, by said decision flag, texels to be excluded from said weighted average, out of said texels read from said texture memory; and
a third circuit for acquiring the weighted average of the texel in accordance with said blend ratio; and
a circuit for pasting said texture color to said pixel.

14. The image processing apparatus according to claim 13, wherein said circuit for determining said filtering domain modifies said LOD values with a predetermined parameter and determines a final filtering domain based on a flag indicative of how many texels are to be used to acquire the texture color, and
wherein in case of selecting a mode of four texels by said flag indicative of how many texels are to be used to acquire the texture color, said first circuit acquires said decision flag corresponding to which one of four-divided areas of texels positioned centrally of nine texels contains the center of said filtering domain.

15. The image processing apparatus according to claim 13, wherein said circuit for determining said filtering domain modifies said LOD values with a predetermined parameter and determines a final filtering domain based on a flag indicative of how many texels are to be used to acquire the texture color, and wherein in case of selecting a mode of nine texels by said flag indicative of how many texels are to be used to acquire the texture color, said first circuit acquires said blend ratio and said decision flag correspondingly to four areas into which said nine texels are divided by lines passing through the center of said filtering domain, a first one of said four areas containing the upper left vertex of said filtering domain, a second one of said four areas containing the upper right vertex of said filtering domain, a third one of said four areas containing the lower left vertex of said filtering domain, and a fourth one of said four areas containing the lower right vertex of said filtering domain.

16. The image processing apparatus according to claim 11, further comprising:

a circuit for creating an address for reading a texel from a texture RAM based on said texture coordinates and said modified LOD values; and a circuit for sampling texels read from said texture RAM, wherein said second circuit enters said texels sampled by said circuit for sampling texels, and rearranges corresponding texels based on said flag indicative of how many texels are to be used to acquire the texture color.

* * * * *